No. 850,338. PATENTED APR. 16, 1907.
P. F. BOLTON.
APPARATUS FOR SECURING THE COMPONENT PARTS OF COMPOUND LUMBER TOGETHER.
APPLICATION FILED NOV. 1, 1905.
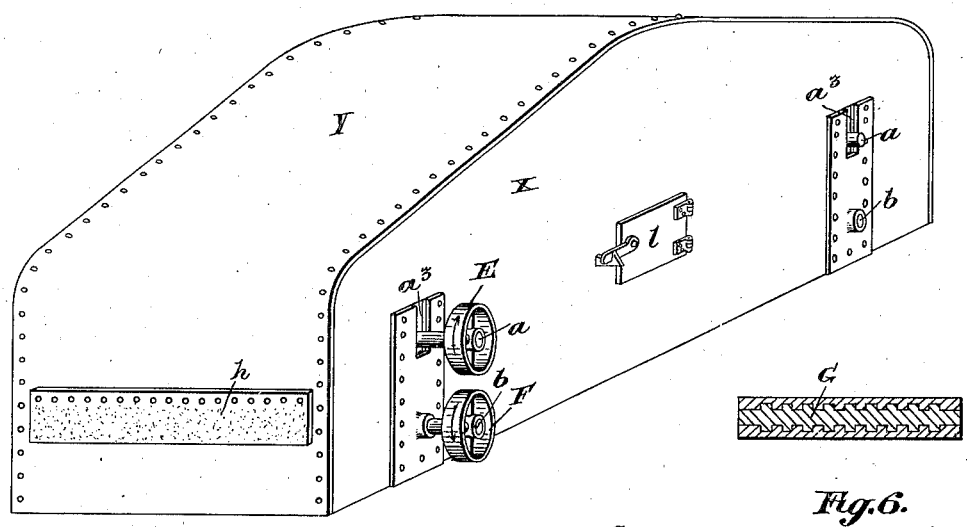
Fig.1.
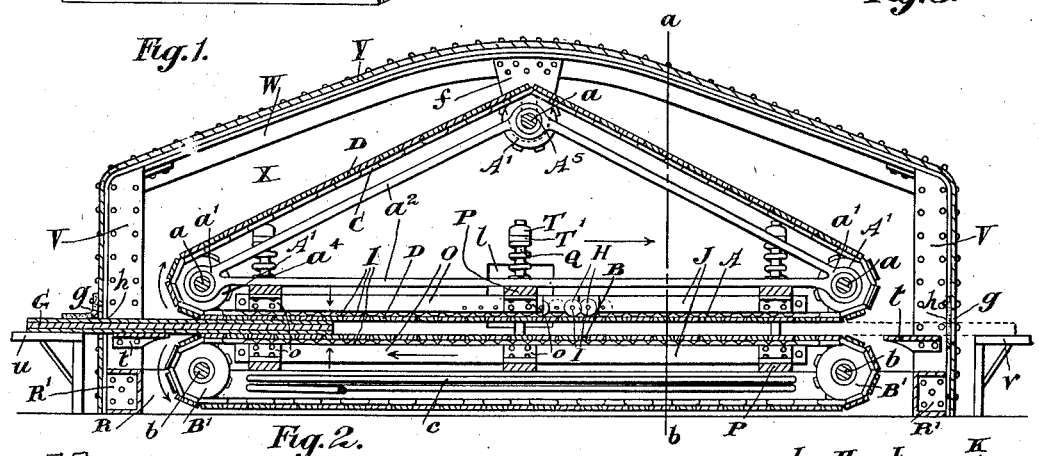
Fig.2.
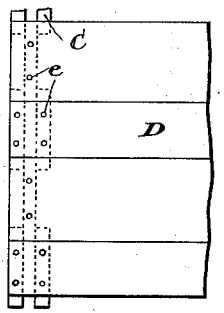
Fig.4.
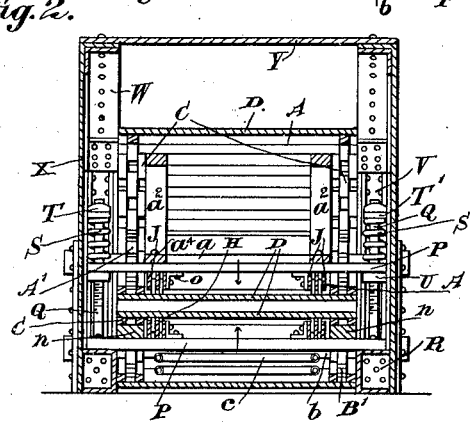
Fig.3.
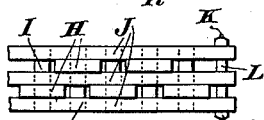
Fig.5.
Fig.6.
Witnesses.
L. I. Sharpe.
F. McDermott.
Inventor,
Paul F. Bolton,
by Gaston R. Carl
Atty

UNITED STATES PATENT OFFICE.

PAUL FRANKLIN BOLTON, OF TORONTO, ONTARIO, CANADA.

APPARATUS FOR SECURING THE COMPONENT PARTS OF COMPOUND LUMBER TOGETHER.

No. 850,338. Specification of Letters Patent. Patented April 16, 1907.

Application filed November 1, 1905. Serial No. 285,454.

*To all whom it may concern:*

Be it known that I, PAUL FRANKLIN BOLTON, a subject of the King of Great Britain, residing in the city of Toronto, county of York, and Province of Ontario, Canada, have invented certain new and useful Improvements in Apparatus for Securing the Component Parts of Compound Lumber Together, of which the following is a specification.

My invention relates to improvements in apparatus for securing the component parts of compound lumber together; and the object of my invention is to firmly bind the component parts of compound lumber together at all points, thus insuring the product being substantially a homogeneous body; and it consists of the parts constituting the apparatus hereinafter described.

Figure 1 is a general perspective view of my preferred form of invention. Fig. 2 is a vertical central longitudinal section through Fig. 1. Fig. 3 is a vertical cross-section on the line *a b*, Fig. 2. Figs. 4 and 5 are details hereinafter referred to, and Fig. 6 is an enlarged cross-section through a piece of compound lumber.

In the drawings like characters of reference indicate corresponding parts in each figure.

The usual method of securing the component parts of compound lumber together consists in passing the lumber between a series of rollers. Previous to this operation it is of course understood that the contacting surfaces of the filler have been coated with adhesive material, such as glue, and the facings placed thereon by hand. From actual practice it is found that as the lumber passes between the rollers it is squeezed tightly together at the point of pressure, and as soon as the lumber has passed beyond the rollers there is more or less separation of the parts. As the lumber passes on between the next pair of rollers the component parts of same are quite often longitudinally displaced relative to each other, thus greatly damaging the lumber, as the ends of the component parts thereof must be in substantially the same plane, else there is considerable wastage. Furthermore, it is found that the action of the rollers upon the lumber forces the greater portion of the adhesive material out from between the component parts thereof to such an extent that when the rear end of the lumber passes from between the rollers the adhesive material is often forced thereout of in handfuls. From this it will be understood that there is very little chance of the component parts of the compound lumber being uniformly coated on their contacting surfaces with the adhesive material, thus causing the parts to more or less separate when doors and other parts have been manufactured therefrom. To illustrate, the action of the rollers on the compound lumber in forcing the adhesive material thereoutof is similar to the action of one's hand when a wet cloth is drawn therethrough. Even should the old method insure the even coating of the contacting surfaces of the compound lumber with the adhesive material it certainly renders it impossible to imprison sufficient of the adhesive material within the lumber in order to secure the parts firmly together.

Now by means of my invention the compound lumber is subjected to a constant and uniform pressure throughout, which pressure is applied substantially at right angles to its longitudinal diameter, and as the lumber is held between two belts having a uniform rate of movement it will be understood that there is no danger of longitudinal displacement of the component parts thereof; neither is there any danger of the partial separation of the component parts of the lumber as occurs in the old method when the lumber passes from between the different pairs of rollers. As of course will be understood, the contacting surfaces of the filler are coated with the adhesive material and the facings are placed thereon by hand. Now it will be understood that from the action of the forces exerted upon the component parts of the lumber and substantially at right angles to the longitudinal diameter thereof by the moving belts a very small percentage of the adhesive material will be squeezed thereoutof. The action of the old method is substantially that of wringing or squeezing the adhesive material out of the lumber, whereas the action of my apparatus is a compressing one applied in the direction before described, so as to imprison within the compound lumber as much of the adhesive material as is necessary. It is my belief that on account of the nature of the force squeezing or holding the component parts of the lumber together and the length of time this force is in operation that more or less of the adhesive material is forced directly into the pores of the wood, this being particularly the case with the softer woods forming part of the compound lumber.

A and B are the endless belts, and same pass around their respective sprocket-wheels A' and B', having bearing, respectively, on the shafts $a$ and $b$. These endless belts may be of any suitable construction. According to the construction shown I show the usual sprocket-chain C, to which are suitably secured strips D, made of suitable material, such as metal, and which normally abut each other, so as to provide an unbroken and level surface when in contact with the lumber. According to the construction shown the strips D are secured to the sprocket-chains by the screws or rivets $e$. By means of pulleys E and F (or any other suitable means) the belts A and B are operated in the direction indicated by arrow. As shown, the compound lumber G is fed between these belts and firmly grasped by same and carried along in the direction indicated by arrow until the lumber for its whole length is firmly held between said belts. It will be understood that as these belts move in the same direction and with a uniform rate of speed there will be no danger of longitudinal displacement of the component parts thereof.

Coöperating with the belts A and B are antifriction means, which means also insure the belts operating parallel with each other in their working position. According to the construction shown the antifriction means for these belts consist of a plurality of rollers H, held by their spindles I in strips J. By means of any suitable bolt K and spacers L held thereon and with the coöperation of the nuts M on said belt the strips J are held together and with such relation as to permit of the free movement of the rollers H. Upon referring to Figs. 2 and 3 it will be seen that the rollers only come in contact with the strips D as they extend a suitable distance beyond the strips J. The antifriction devices (which I shall hereinafter refer to as O) are secured by brackets $o$ to cross-pieces P, which are supported on rods Q, secured to the side members R of any suitable frame with which my apparatus is provided. The lower cross-pieces P also rest upon the side members R. The shafts $a$ have bearing in the ends $a'$ of the frame, which is composed of the parts $a^2$. Where the shafts $a$ extend through the sides X the sides are slotted, as shown at $a^3$. The frame composed of the parts $a^2$ is suitably secured to the upper cross-pieces P, as shown at $a^4$. Held on the rods Q above the upper cross-pieces P are springs S. By means of the nuts T on said rods and the washers T', interposed between same and the springs S, it will be understood that I can regulate the tension of said springs upon the upper cross-pieces P, and thus regulate the pressure of the upper antifriction devices O upon the belt A. It will of course be understood that the increase of pressure upon the belt A will move same closer to the belt B, thus increasing the pressure applied by said belts upon the lumber. It will also be understood that by means of the construction just described I am enabled to adjust said belts so that they will operate parallel to each other for the required distance. Before the pressure just described can be exerted upon the belt A the nuts U, screwing on said rods and abutting against the under side of the upper cross-pieces P, must be lowered.

When I wish to adjust the distance between the belts, so that different thicknesses of compound lumber may be firmly held therebetween, I manipulate the nuts U. As the upper pair of antifriction devices O are secured to the upper cross-pieces P and the frame composed of the parts $a^2$ are secured to the said upper cross-pieces and as the shafts $a$ have bearing in said frame, it will be understood that by screwing up the nuts U the before-mentioned parts, together with the sprocket-wheels A' and the belt N, will be moved upward therewith the required distance. From this it will be understood that the sprocket-wheels A' are always moved whenever the belt A be raised or lowered, thus preventing any danger of said wheels coming in contact with the lumber. It will of course be understood that there are two of these frames composed of the parts $a^2$.

Except the sprocket-wheels on the shafts $a$ and $b$, provided, respectively, with the pulleys E and F, the rest of the sprocket-wheels are idlers. The shaft $a$ of the highest-placed idler A' is held in suitable bearings in a depending bracket $f$, suitably secured to the frame of the apparatus. The bracket $f$ is slotted, as shown at $A^5$, so as to allow of the up-and-down movement of the shaft held therein to correspond with the movement of the frame composed of the parts $a^2$.

As it is preferable to apply heat to the component parts of the lumber when they are being secured together, I house the belts and their connected parts after any suitable construction.

R' are the end members of the frame which are secured to the side members R. At each corner of the frame are uprights V, which are connected together by pieces W.

X are the inclosing sides for the frame, and Y the inclosing top and ends.

Where the lumber is fed into and out from the housing are openings $g$. In order to retain the heat within said housing, these openings are provided with flaps $h$, which cover said openings after the lumber has passed thereinto and thereoutof.

In order to permit of the inspection of the interior of the apparatus, I provide any suitable door $l$.

In order to prevent unnecessary sagging in the lower belt B, I secure underneath same skids $n$, secured to the lower cross-pieces P. When I use sprocket-chains, it will be understood that same will ride upon said skids, as shown in Fig. 3.

Secured to or forming part of the uprights V are shelves $t$, the upper surface of which is in the same plane as the upper surface of the part of the belt B, which is in position to receive the lumber, thus preventing sagging of said lumber after it leaves any suitable feeding-table V. At the delivery end of the apparatus there is a similar shelf, which prevents the sagging of the end of the lumber as it passes from between the belts, thus insuring it passing onto any suitable receiving-table $u$.

The apparatus will be heated by any suitable means. For the purpose of illustrating that the apparatus may be heated I show an ordinary pipe-coil $c$. It is my intention to make my apparatus of sufficient length so that by the time the lumber has passed therethrough it will be dried sufficiently in order to at once permit of its use for manufacturing purposes. It will of course be understood that the strips D extend transversely of the apparatus from one set of sprocket-wheels to the other, so that their ends may be secured to the sprocket-chains coöperating therewith.

I do not confine myself to the construction herein shown and described, as my invention can be embodied in many different forms of construction without departing from the spirit thereof.

What I claim as my invention is—

1. In an apparatus of the class described, the combination with two endless belts, one operating above the other, consisting of sprocket-chains to which are secured a plurality of strips which when in operative position present an unbroken and level surface so that the compound lumber held between said endless belts will be subjected to uniform and constant pressure; the sprocket-wheels for said upper belt; the sprocket-wheels for said lower belt; the shafts for said upper and lower sets of sprocket-wheels, and a fixed frame in which have bearing the shafts for said sprocket-wheels for said lower belt, of a rigid frame supporting the shafts for the sprocket-wheels of said upper belt; antifriction devices rigidly mounted within said frame and against which operates said upper endless belt; the said frame being mounted to yield and yet maintain portion of the upper belt parallel to portion of the lower belt, and antifriction devices rigidly mounted in said fixed frame so as to maintain portion of said lower belt parallel to portion of said upper belt, and upon which said lower belt operates.

2. In an apparatus of the class described, the combination with two endless belts one operating above the other, consisting of sprocket-chains to which are secured a plurality of strips which when in operative position present an unbroken and level surface so that the compound lumber held between said endless belts will be subjected to uniform and constant pressure; the sprocket-wheels for said upper belt; the sprocket-wheels for said lower belt; the shafts for said upper and lower sets of sprocket-wheels, and a fixed frame in which have bearing the shafts for said sprocket-wheels for said lower belt, of a rigid frame supporting the shafts for the sprocket-wheels of said upper belt; rods secured to said fixed frame; the upper cross-pieces held on said rigid frame; antifriction devices rigidly mounted within said rigid frame and against which operate said upper endless belt; springs held on said rods so that said rigid frame may yield and yet maintain portion of said upper belt parallel to portion of the lower belt; the lower cross-pieces secured to said fixed frame, and antifriction devices rigidly mounted in said fixed frame so as to maintain portion of said lower belt parallel to portion of said upper belt and upon which said lower belt operates.

3. In an apparatus of the class described, the combination with two endless belts one operating above the other, consisting of sprocket-chains to which are secured a plurality of strips which when in operative position present an unbroken and level surface so that the compound lumber held between said endless belts will be subjected to uniform and constant pressure; the sprocket-wheels for said upper belt; the sprocket-wheels for said lower belt; the shafts for said upper and lower sets of sprocket-wheels, and a fixed frame in which has bearing the shafts for said sprocket-wheels for said lower belt, of an adjustable frame supporting the shafts for said sprocket-wheels for said upper belt; rods secured to said fixed frame; the upper cross-pieces held thereon and supporting said adjustable frame; springs held on said rods so as to exert pressure upon said upper belt; antifriction devices interposed between said upper cross-pieces and said upper belt and consisting of a plurality of rollers having bearing in retaining-strips; lower cross-pieces secured to said fixed frame; antifriction devices interposed between said lower cross-pieces and said lower belt and consisting of a plurality of rollers having bearing in retaining-strips, and means for giving said endless belts uniform movement in the same direction.

4. In an apparatus of the class described, the combination with two endless belts one operating above the other, consisting of sprocket-chains to which are secured a plurality of strips which when in operative position present an unbroken and level surface so that the compound lumber held between said endless belts will be subjected to uniform and constant pressure; the sprocket-wheels for said upper belt; the sprocket-wheels for said lower belt; the shafts for said upper and lower sets of sprocket-wheels, and a fixed frame in which has bearing the shafts for said sprocket-wheels for said lower belt, of an adjustable frame supporting the shafts for said sprocket-wheels for said upper belt; rods secured to said fixed frame; the upper cross-piece held thereon and supporting said adjustable frame; springs held on said rods so as to exert pressure upon said upper belt; antifriction devices interposed between said upper cross-pieces and said upper belt and consisting of a plurality of rollers having bearing in retaining-strips; lower cross-pieces secured to said fixed frame; antifriction devices interposed between said lower cross-pieces and said lower belt and consisting of a plurality of rollers having bearing in retaining-strips; means for giving said endless belts uniform movement in the same direction, and a housing inclosing said parts and provided with suitable openings.

5. In an apparatus of the class described, the combination with two endless belts one operating above the other, consisting of sprocket-chains to which are secured a plurality of strips which when in operative position present an unbroken and level surface so that the compound lumber held between said endless belts will be subjected to uniform and constant pressure; the sprocket-wheels for said upper belt; the sprocket-wheels for said lower belt; the shafts for said upper and lower sets of sprocket-wheels, and a fixed frame in which has bearing the shafts for said sprocket-wheels for said lower belt, of an adjustable frame supporting the shafts for the sprocket-wheels for said upper belt; rods secured to said fixed frame; the upper cross-pieces held thereon and supporting said adjustable frame; springs held on said rods so as to exert pressure upon said upper belt; antifriction devices interposed between said upper cross-pieces and said upper belt; nuts screwing on said rods and upon which said upper cross-pieces rest; lower cross-pieces secured to said fixed frame; antifriction devices interposed between said lower cross-pieces and said lower belt, and means for giving said endless bolts uniform movement in the same direction.

6. In an apparatus of the class described, the combination with two endless bolts one operating above the other and consisting of sprocket-chains to which are secured a plurality of stiff strips which when in operative position abut each other so as to present an unbroken and level surface so that the compound lumber held between said endless belts will be subjected throughout to uniform and constant pressure; sprocket-wheels over which said sprocket-chains pass; the shafts for said sprocket-wheels; a suitable frame for supporting the shafts for the lower sets of sprocket-wheels; an adjustable frame supporting the shafts for the upper set of sprocket-wheels; means for moving said adjustable frame so as to regulate the pressure exerted by said endless belts; means placed so as to keep said belts a constant distance apart at all points while in operative position, and means for giving said endless belts uniform movement in the same direction.

In testimony whereof I have signed my name to this specification in the presence of two subscribing witnesses.

PAUL FRANKLIN BOLTON.

Witnesses:
  EGERTON R. CASE,
  L. G. SHARPE.